United States Patent
Higure et al.

(10) Patent No.: US 8,094,642 B2
(45) Date of Patent: Jan. 10, 2012

(54) POLLING METHOD AND VEHICLE SEARCH METHOD IN DIGITAL RADIO COMMUNICATION SYSTEM

(75) Inventors: Kin'ichi Higure, Kodaira (JP); Masayuki Kanazawa, Kodaira (JP); Minoru Sakaihori, Kodaira (JP); Yuzo Hiraki, Kodaira (JP)

(73) Assignee: Hitachi Kokusai Electric, Inc., Tokyo (JP)

(*) Notice: Subject to any disclaimer, the term of this patent is extended or adjusted under 35 U.S.C. 154(b) by 0 days.

(21) Appl. No.: 12/881,352

(22) Filed: Sep. 14, 2010

(65) Prior Publication Data
US 2010/0329233 A1    Dec. 30, 2010

Related U.S. Application Data

(63) Continuation of application No. 10/569,627, filed on Dec. 20, 2006, now abandoned.

(30) Foreign Application Priority Data

Aug. 27, 2003  (JP) ................................ 2003-303256
Jan. 6, 2004   (JP) ................................ 2004-000806

(51) Int. Cl.
| | |
|---|---|
| H04J 3/16 | (2006.01) |
| H04L 12/42 | (2006.01) |
| H04L 12/403 | (2006.01) |
| G05B 23/02 | (2006.01) |
| H04M 11/00 | (2006.01) |
| G06F 3/00 | (2006.01) |
| G06F 5/00 | (2006.01) |
| G06F 13/22 | (2006.01) |

(52) U.S. Cl. .... 370/346; 370/449; 340/3.51; 379/92.01; 710/44; 710/220

(58) Field of Classification Search .................. 370/346, 370/449; 340/3.51; 379/92.01; 710/44, 710/220
See application file for complete search history.

(56) References Cited

U.S. PATENT DOCUMENTS

| | | | |
|---|---|---|---|
| 5,025,486 | A | 6/1991 | Klugart |
| 2002/0019239 | A1 | 2/2002 | Kasapidis |
| 2002/0135916 | A1* | 9/2002 | Maeda et al. .................. 360/51 |
| 2004/0090962 | A1 | 5/2004 | Forest et al. |
| 2007/0165591 | A1 | 7/2007 | Higure |

FOREIGN PATENT DOCUMENTS

JP          11069441       3/1999
(Continued)

OTHER PUBLICATIONS

Successive, Cambridge Dictionary Online, 2 pages.*

Primary Examiner — Nick Corsaro
Assistant Examiner — Munsoon Choo
(74) Attorney, Agent, or Firm — Brundidge & Stanger, P.C.

(57) ABSTRACT

The present invention provides a polling method in a radio digital communication system making it possible to shorten time required for polling without causing increase in an error rate and to efficiently manage and administrate communications. In a digital radio communication system for collecting information from a plurality of terminal stations by polling, a polling response signal to be transmitted from each terminal station to a base station has a frame format constructed of a one-frame in which a cyclic bit pattern is placed at a leading end of the frame format.

6 Claims, 12 Drawing Sheets

FOREIGN PATENT DOCUMENTS

| | | |
|---|---|---|
| JP | 2000003420 | 1/2000 |
| JP | 2000196689 | 7/2000 |
| JP | 2002064421 | 2/2002 |
| JP | 2002111759 | 4/2002 |
| JP | 2003052066 | 2/2003 |
| JP | 2003076791 | 3/2003 |
| JP | 2003115773 | 4/2003 |

* cited by examiner

FIG. 1

| SP | | | | |
|---|---|---|---|---|
| LP+R 44 | SW 20 | RICH 56 | TCH 256 | G 8 |

LP+R: LINEARIZER PREAMBLE+BURST TRANSIENT RESPONSE GUARD TIME
SW: SYNCHRONOUS WORD
RICH: RADIO INFORMATION CHANNEL
TCH: TRAFFIC CHANNEL
G: GUARD TIME
*NUMERALS IN THE FIGURE INDICATE THE NUMBER OF BITS.

PRIOR ART     ## FIG. 2

| SB | | | | | | |
|---|---|---|---|---|---|---|
| LP+R 40 | P 88 | RICH 56 | SW 32 | P 56 | PICH 104 | G 8 |

LP+R: LINEARIZER PREAMBLE+BURST TRANSIENT RESPONSE GUARD TIME
P: PREAMBLE
RICH: RADIO INFORMATION CHANNEL
SW: SYNCHRONOUS WORD
PICH: PARAMETER INFORMATION CHANNEL
G: GUARD TIME
*NUMERALS IN THE FIGURE INDICATE THE NUMBER OF BITS.

PRIOR ART     ## FIG. 3

| SC | | | | | | |
|---|---|---|---|---|---|---|
| LP+R 30 | P 2 | TCH 96 | RICH 56 | SW 20 | UD 20 | TCH 160 |

LP+R: LINEARIZER PREAMBLE+BURST TRANSIENT RESPONSE GUARD TIME
P: PREAMBLE
TCH: TRAFFIC CHANNEL
RICH: RADIO INFORMATION CHANNEL
SW: SYNCHRONOUS WORD
UD: UNDEFINED
PICH: PARAMETER INFORMATION CHANNEL
*NUMERALS IN THE FIGURE INDICATE THE NUMBER OF BITS.

PRIOR ART *FIG. 4*
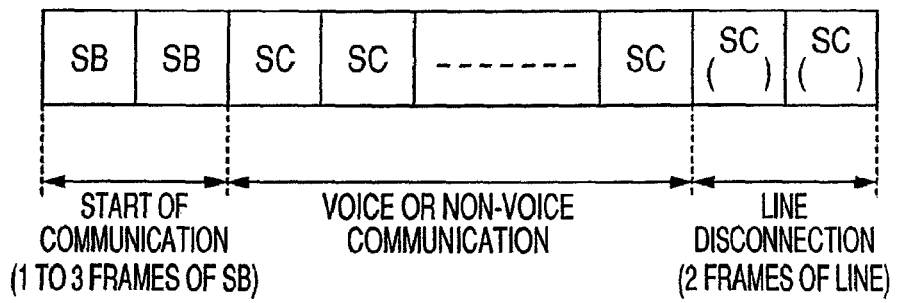
*FIG. 5*
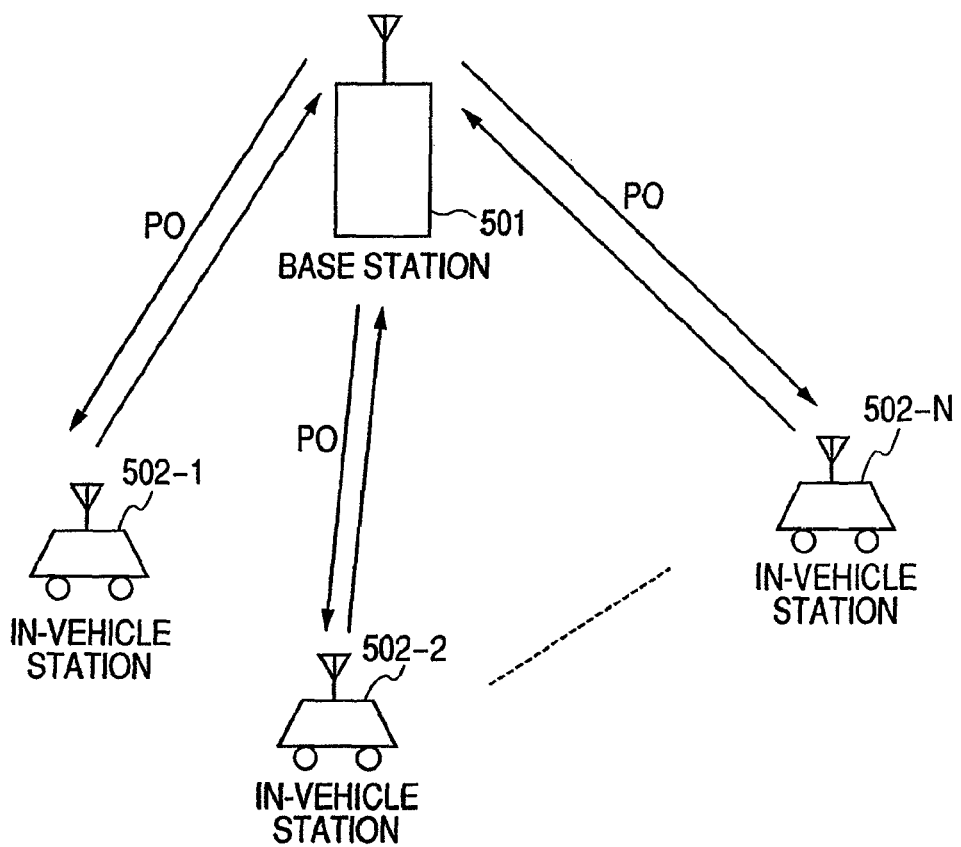

FIG. 13(a)
POLLING SIGNAL
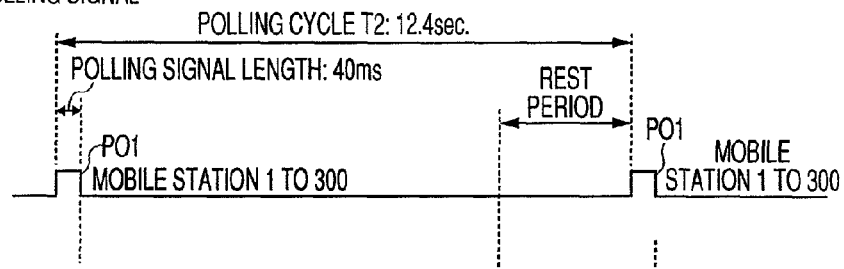
FIG. 13(b)
POLLING RESPONSE SIGNAL
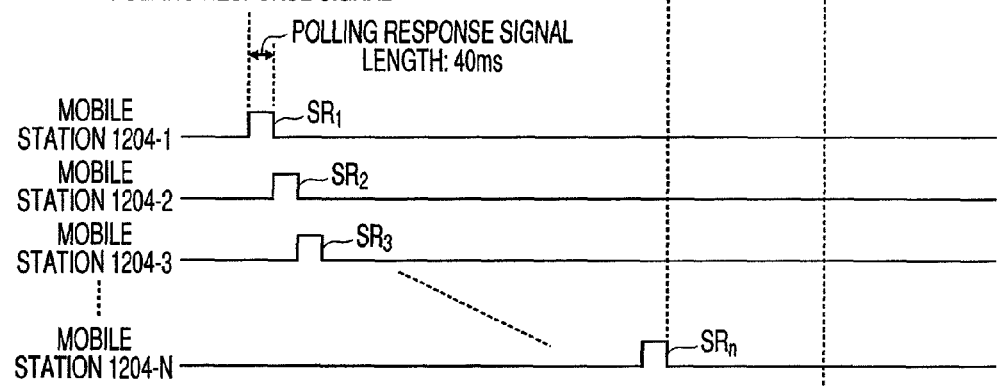
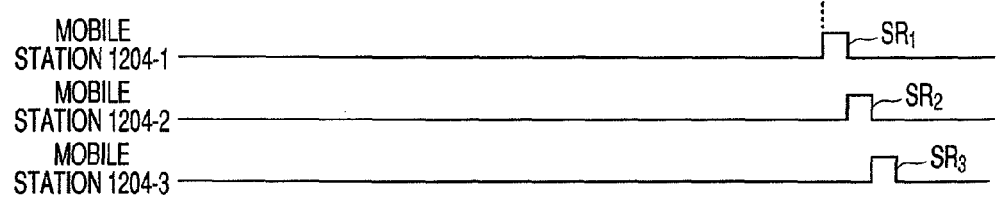

POLLING METHOD AND VEHICLE SEARCH METHOD IN DIGITAL RADIO COMMUNICATION SYSTEM

The present application is a continuation application of application Ser. No. 10/569,627, filed Dec. 20, 2006, now abandoned which relates to and claims priority from Japanese Patent Application No. 2003-303256, filed on Aug. 27, 2003 and Japanese Patent Application No. 2004-000806, filed on Jan. 6, 2004, the entire disclosure of which is incorporated herein by reference.

TECHNICAL FIELD

The present invention relates to a polling method and a vehicle search method in a digital radio communication system, and more specifically to a polling method and a vehicle search method well adapted to a mobile communication system.

BACKGROUND ART

There has been known a digital radio communication system in which, when digital information is transmitted via a radio communication system, the information (such as a bit string of binary signals) is divided into a prespecified number of bits to generate a prespecified frame structure including the divided bit string, and a received base band signal is modulated to a digital signal by means of the modulation system such as the $\pi/4$ shift QPSK (Quadrature Phase Shift Keying) system to transmit the digital signal as a digitally modulated signal. The digital radio communication system as described above is widely used as an AVM (Automatic Vehicle Monitoring) system, for instance, for allocating taxis with a radio communication system. In this case a particular communication station functions as a master station (or a base station), and a number of communication terminal stations (which are sometimes referred to as in-vehicle stations or as slave stations) makes communications under control by the master station.

In the digital radio communication system as described above, it is necessary for the master station to always recognize information about a current state of each vehicle including a position of a slave station in the car, whether a passenger is in the vehicle or not, and whether any abnormality has occurred in the vehicle or not, and the communication system referred to as "polling system" is widely used. Refer to, for instance, Japanese Patent Laid-Open Publication No. 5-284561 (patent document 1).

The digital radio communication system as described above is described below with reference to FIG. 5. FIG. 5 schematically shows a case in which the digital communication system as described above is applied to a taxi radio communication system. For instance, in-vehicle stations 502-1, 502-2, . . . 502-N are connected to a master station 501. In the digital radio communication system shown in FIG. 5, when the master station 501 tries to collect vehicle's current state information from each of N units of in-vehicle stations, the master station 501 periodically transmits a polling signal PO to the in-vehicle stations 502-1, 502-2, . . . 502-N to collect the vehicle's current state information from each in-vehicle station as shown in FIG. 6. When each of the n-vehicle stations 502-1, 502-2, . . . 502-N receives the polling signal PO from the master station 501, the in-vehicle stations 502-1, 502-2, . . . 502-N transmit polling response signals S1, S2, . . . Sn including the vehicle's current state information sequentially at a timing previously assigned to each vehicle.

The sequence of transmission of the polling response signal after reception of a polling signal by each vehicle is optional, and in the taxi radio communication system, the sequence can be decided, for instance, according to vehicle's number of the vehicles. There is no restriction over the method of deciding the sequence.

For a communication system to be employed in the digital radio communication system as described above, there are the standard specifications based on a narrow band digital communication system such as the digital SCPC (Single Channel Per Carrier) system or the FDMA. In general, the communication system is operated based on these standard specifications. In the standard specifications, a frame format of a radio signal is based on the Japanese standard ARIB STANDARD-T61 (referred to as ARIB STD-T61 below).

FIG. 2 and FIG. 3 illustrate signal frame formats based on the ARIB STD-T61. FIG. 2 illustrates a frame format of a synchronous burst SB. The synchronous burst SB is generally a signal transmitted for establishing synchronicity in communications when a communication channel is set and also when a channel is switched. FIG. 3 illustrates a frame format of a communication channel SC. Formats of the synchronous burst SB and the communication channel SC constitute a frame as a minimum unit of a radio communication signal, and radio communication is performed by repeating the frame. The frame cycle is fixed to 40 ms.

In FIG. 2 and FIG. 3, a portion LP+R indicates a linearizer preamble and bust transient response guard time, a portion P indicates a preamble, a portion RICH indicates a radio information channel, a portion SW indicates a synchronous word, a portion PICH indicates a parameter information channel, a portion G indicates a guard time, and a portion UD indicates a portion not defined yet. Numerals in FIG. 2 and FIG. 3 indicate bit numbers respectively. The abbreviates above are defined in the ARIB STD-T61 described above.

FIG. 4 is a view illustrating an example of a frame transmitted when communication is performed based on the SCPC (Single Channel Per Carrier) system described above. As clearly understood from this figure, to start communication, at first 1 to 3 frames of a synchronous burst SB are transmitted (although 2 frames are shown in FIG. 4), and then voice or non-voice communication is performed via a communication channel SC. Then 2 frames of the communication channel SC comprising an aerial signal are transmitted to notify termination of the communication.

The master station 501 and each of the in-vehicle stations 502-1 to 502-N perform signal transactions by means of the demodulation system of, for instance, $\pi/4$ shift QPSK based on the standard specifications. An example of a transmitter at each of the in-vehicle stations 502-1 to 502-N is described below with reference to a block diagram shown in FIG. 7. Also an example of a receiver at the master station 501 is described with reference to a block diagram shown in FIG. 8.

At first, the transmitter shown in FIG. 7 is described. Data for ordinary voice communication or non-voice communication is inputted to an outgoing data input terminal 701. In this step, also data for vehicle's current state information transmitted from each in-vehicle station for polling is inputted to this outgoing data input terminal 701. The vehicle's current state information includes data specific to each vehicle such as positional information about an in-vehicle station (vehicle) on which the transmitter is loaded and information as to whether a passenger is in the vehicle or not.

Data for the vehicle's current state information inputted to the outgoing data input terminal 701 is supplied to the channel encoding section 702. The channel encoding section 702 adds communication information required for communication to the vehicle's current state information inputted to the outgoing data input terminal 701 to generate a frame format for the synchronous burst SB shown in FIG. 2 or for the communication channel SC shown in FIG. 3. The channel encoding section 702 then supplies the frame format as the 384-bit data to a S/P (serial/parallel) converting section 703. The channel encoding section 702 operates under control by a transmission control section comprising a microcomputer or the like not shown, and is switched between a mode for configuring a synchronous burst SB and a mode for configuring a communication channel SC during operation.

When at first a synchronous burst SB is configured to construct an outgoing frame shown in FIG. 4, the channel encoding section 702 arrays data for LP+R, P, RICH, SW, P and G to form the frame structure shown in FIG. 2 with 384-bit data constructed as a whole, and supplies the resulting data as a synchronous burst SB to the S/P (serial/parallel) converting section 703.

When an operating mode is switched to that for constructing a communication channel SC to configure an outgoing frame, the channel encoding section 702 performs encoding to correct errors for the data inputted from the outgoing data input terminal 701 to generate TCH data. The channel encoding section 702 then adds LP+R, P, RICH, SW, and UD data to the TCH data to configure the frame structure as shown in FIG. 3 for forming 384-bit data, and then sends the 384-bit data as a communication channel SC to the S/P (serial/parallel) converting section 703.

Then the S/P (serial/parallel) converting section 703 converts the data inputted from the channel encoding section 702 to parallel data 2 bits by 2 bits with a symbol cycle T and supplies the parallel data to the mapping section 704, where the symbol cycle T is an inverse number of a symbol rate fb, and in the ARIB STD-T61 standard, because the symbol rate fb is equal to 4.8 KHz, the symbol cycle T is 208 μm. Two lines from the S/P (serial/parallel) converting section 703 are connected to the mapping section 704, and 1 bit are inputted through each of the lines to the mapping section 704, namely 2 bits are inputted simultaneously to the mapping section 704.

The mapping section 704 performs mapping in response to the 2-bit data inputted from the S/P (serial/parallel) converting section 703 according to the known I-Q coordinate system. The mapping is described later. As a result of mapping, the inphase component is (I component) is imputed to an upsampler 705-1, while the orthogonal component (Q component) is inputted to an upsampler 705-2. The upsamplers 705-1, 705-2 subjects the inphase component I and the orthogonal component Q of a signal inputted from the mapping section 704 to oversampling, namely, for instance, 16-times oversampling (16 times of oversampling within a symbol cycle), and inputs the resulting components to LPFs (low-pass filter) 706-1, 706-2.

The LPFs 706-1, 706-2 function to restrict a band of signals inputted from the upsamplers 705-1, 705-2 to prevent interference to an adjoining channel. The signals are then converted to analog signals with D/A (digital/analog) converters 707-1, 707-2, and the resulting analog signals are supplied to a transmission high frequency section circuit and a power amplifier 708. The transmission high frequency section circuit and the power amplifier 708 converts the base band signals outputted from the D/A (digital/analog) converters 707-1, 707-2 to signals in a radio frequency band and then supplies the signals, after power amplification, from an outgoing signal output terminal 709 to an antenna not shown in the figure for signal transmission.

FIG. 9 shows an example of configuration of the mapping section 704, and output signals from the S/P converting section 703 (through the two lines described above) shown in FIG. 7 are inputted via bit data input terminals 901-1, 901-2 to a table 902. For the bit data b1 and b0 inputted from the input terminals 901-1, 901-2 to the table 902, the bit data b1 is inputted earlier as compared to the bit data b0 to the S/P (serial/parallel) converting section 703 shown in FIG. 7 (b1 first).

The table 902 is configured with combinations of the input bit data b1, b0 so that each of the values of 1, 3, −1, and −3 can be obtained as an output d. Namely, 1 is obtained as the output data d for the input bit data (b1, b0) of (0,0), 3 for (0,1), −1 for (1,0), and −3 for (1,1). The output d is inputted to an accumulator 903.

The accumulator 903 has an internal memory (a memory in which the content is reset to 0 when power is turned ON). The accumulator 903 adds the content therein to a value d inputted from the table 902, stores a result of addition s again in the memory, and also input the result of addition s to a surplus computing circuit 904. The surplus computing circuit 904 computes a surplus m (=s mod 8) obtained by dividing the output value s from the accumulator 903 by 8, and inputs the surplus m into the table 905.

The table 905 outputs 8 types of mapping value according to a value m inputted from the surplus computing circuit 904, and the inphase component I is inputted to the upsampler 705-1 shown in FIG. 7 via the inphase component output terminal 906-1, while the orthogonal component Q is inputted to the upsampler 705-2 via the orthogonal component output terminal 906-2. Therefore, the inphase component I and orthogonal component Q, which are output values from the table 905, can be developed on an I-Q coordinate plane as shown in FIG. 10.

A receiver at the base station 501 shown in FIG. 8 is described below. An antenna not shown is connected to an incoming signal input terminal 801. A signal transmitted from the transmitter shown in FIG. 7 is received by the antenna, and the incoming signal is inputted to an incoming high frequency wave section circuit 802. The incoming high frequency wave section circuit 802 converts the incoming signal in the radio frequency band to a signal in an intermediate frequency band to supply the same to an A/D converter 803 for digitizing the signal. Then, the digitized signal is supplied to an orthogonal demodulating section 804.

A signal for the inphase component I and a signal for the orthogonal component Q, both of which are transmitted from the receiver, are outputted from the orthogonal demodulating section 804 and are supplied to the LPFs 805-1 and 805-2 respectively. In the LPF 805-1, unnecessary frequency components are removed from the signal for inphase component I, and in the LPF 805-2, unnecessary frequency components are removed from the signal for orthogonal component Q.

The output signals from the LPFs 805-1, 805-2 are supplied to downsamplers 806-1, 806-2 respectively, where only data for one symbol cycle is taken out in the downsamplers and inputted to a demodulating section 807. Timing for taking out the unnecessary frequency components in the downsamplers 806-1, 806-2 is controlled by a timing synchronizing section not shown so that the unnecessary frequency components are correctly taken out according to the symbol timing (in synchronism to a symbol).

In the demodulating section 807, symbol determination is performed according to the inphase component I and orthogonal component Q inputted from the downsamplers 806-1, 806-2, and 2-bit determination data is supplied to a P/S (Parallel/serial) converting section 808 to convert the 2-bit data to serial data, which is inputted to a channel decoding section 809. The channel decoding section 809 separates necessary information and data from the data inputted from the P/S converting section 808, namely decodes a frame structure of a communication channel SC shown in FIG. 3, extracts data from TCH section, decodes the data to obtain incoming data, and outputs the data from an output terminal 810 to supply the data to a data processing section not shown.

It should be noted that FIG. 8 shows a case in which the incoming high frequency wave section circuit 802 operates according to the super heterodyne system. When the incoming high frequency wave section circuit 802 operates according to the direct conversion system, the inphase component I signal and the orthogonal component Q signal are outputted directly from the incoming high frequency wave section circuit 802. In this case, the inphase component I signal and the orthogonal component Q signal outputted from the incoming high frequency wave section circuit 802 are inputted separately via the A/D converter into the LPFs 805-1, 805-2 respectively. Therefore, the orthogonal demodulating section 804 is not necessary.

In the prior art, the system shown in FIG. 4 is applied also to a polling response signal sent from an in-vehicle station to a base station, after a synchronous burst SB is transmitted by 1 to 3 frames, voice communication or non-voice communication is performed via the communication channel SC, and then a communication channel SC comprising an aerial line signal is transmitted by 2 frames to notify an end of communication.

Radio communication between the base station and in-vehicle stations 502-1 to 502-N have been described above. In a radio communication system such as an AVM system for allocating taxies based on the prior art, a current position of an in-vehicle station as a mobile station (a vehicle such as a taxi) is detected with the GPS (Global Positioning System) by and stored in the in-vehicle station itself. Each mobile station returns vehicle's current position information as a response by using a response slot dedicated to each mobile station according to a polling signal cyclically sent from the base station. The base station sequentially performs polling to all vehicles which are mobile stations to grasp current position information about all of the mobile stations. In the system as described above, there is at least one base station which is connected to a management center, and the management center searches an optimal vehicle from the current position information sent from the mobile stations according to a request for allocation of a vehicle from a client and allocates the vehicle (taxi).

DISCLOSURE OF THE INVENTION

In the prior art, there is no countermeasures against the problem that the time required for polling increases in association with increase of slave terminals, and because of this problem, efficient communication can not be realized.

Furthermore in the prior art, also when a polling response signal is transmitted from a in-vehicle station to the base station, at first a synchronous burst SB is transmitted by 1 to 3 frames, and then voice communication or non-voice communication is performed through the communication channel SC, and then an end of the communication is notified by sending the communication channel SC comprising an aerial signal by 2 frames. In this case, even when a data volume required for transmission of vehicle's current state information to be transmitted in response to polling is satisfied with one frame of the communication channel SC, it is necessary to send data comprising at least 4 frames (=160 ms), namely 1 frame for the synchronous burst, 1 frame for the communication channel, and 2 frames for the aerial signal, and for instance. When it is necessary to collect vehicle information from 400 taxies, at least a time period of 64 seconds is required for collecting information from all of the vehicles by performing polling once.

It is conceivable to burst only 1 frame for the communication channel SC shown in FIG. 3 as a polling response signal from each in-vehicle station to shorten the time required for collecting information by polling. In this method, the time required for collecting information from all vehicles can be shortened, but there is the problem that ACG (Automatic Gain Control) in a receiver at the base station can not be stabilized at a leading end of a frame.

Moreover, when AFC (Automatic Frequency Control) is applied to a receiver at the base station, an error is generated also in an operation for AFC due to an error in symbol timing synchronization, and accordingly the error rate in TCH data increases. Especially, in the taxi radio communication system in which slave stations move around, a distance between the base station and each in-vehicle station and a situation of propagation of electric waves inevitably change. Accordingly, a received power of a signal from each in-vehicle station changes at the base station. Therefore, when the base station receives a signal from each in-vehicle station, it is necessary that the AGC sufficiently function for each frame, but in the method described above, it is not possible to stabilize AGC at a leading end of each frame. As a result, the AGC can not be stabilized before a leading end of the TCH data inserted in a forward section of each frame, which leads to increase of the error rate.

The AFC in a general receiver is performed by using a known preamble pattern included in a synchronous burst. Therefore, when a burst comprising only 1 frame is transmitted as an outgoing frame, for providing AFC to a signal from the base signal to each in-vehicle station, there is no way but to use a synchronous word SW which is a known pattern signal. However, when a synchronous word SW is used as described above, to provide AFC, it is necessary to establish synchronicity in the symbol timing. When there is an error in the symbol timing synchronicity, an error is generated in an operation for AFC, so that the receiving error rate increases in TCH data.

Therefore, in the prior art as described above, it is necessary to transmit data with the length of at least 4 frames (=160 ms) as a polling response signal transmitted from an in-vehicle station to the base station. Therefore, as described above, the problem occurs that at least a time period of at least 64 seconds is required for colleting information from all of 400 taxies by polling once. The system as described above can not be applied to a large scale taxi allocating system, and the number of in-vehicle stations to be connected to the base station is at most about 100.

It is an object of the present invention to provide a polling system based on a digital radio communication system enabling efficient communication.

It is another object of the present invention to provide a polling method based on a digital radio communication system enabling reduction of time required for polling without causing increase in an error rate.

It is still another object of the present invention to provide a vehicle searching method enabling collection of vehicle's current state information from in-vehicle stations within a short period of time and efficient allocation of vehicles even in a large scale system.

The present invention provides a polling method in a digital radio communication system for collecting information from a plurality of terminal stations by polling, wherein a polling response signal to be transmitted from each terminal station to a base station has a frame format constructed of a one-frame in which a cyclic bit pattern is placed at a leading end of the frame format Furthermore the polling method in a digital radio communication system according to the present invention is configured such that a modulating system for signal transfer is the π/4 shift QPSK system, and all bits in the cyclic bit pattern are "0".

The polling method in a digital radio communication system according to the present invention is configured such that the modulating system for signal transfer is the π/4 shift QPSK system, and each of all bits in the cyclic bit pattern are a repetitive bit pattern comprising binary values of "1" and "0".

The present invention provides a vehicle search method in a digital radio communication system for collecting information from a plurality of terminal stations into a base station by polling, wherein a polling response signal to be transmitted from each terminal station to the base station has a frame format constructed of a one-frame in which a cyclic bit pattern is placed at a leading end of the frame format, and the base station collects information from the terminal stations based on the polling response signal constructed of the one-frame in response to a request for allocation of a vehicle from a client.

The present invention provides a digital radio communication system in which a base station collects information from each of a plurality of terminal stations by polling, wherein the terminal station comprises a data input section, a channel encoding section for adding information required for communication to the input data to configure a frame of the polling response signal, a mapping section for mapping output from the channel encoding section, and a high frequency wave section for subjecting the mapped data formed in the mapping section to high frequency conversion for amplification, and wherein a polling response signal generated in the channel encoding section has a frame format constructed of a one-frame in which a cyclic bit pattern is placed at a leading end of the frame format.

The present invention provides a vehicle searching method in a digital radio communication system in which a base station collects information from each of a plurality of terminal stations by polling, and the terminal station comprises a data input section, a channel encoding section for adding information required for communication to the input data to configure a frame of the polling response signal, a mapping section for mapping output from the channel encoding section, and a high frequency wave section for subjecting the mapped data formed in the mapping section to high frequency conversion for amplification, wherein a polling response signal generated in the channel encoding section has a frame format constructed of a one-frame in which a cyclic bit pattern is placed at a leading end of the frame format, and wherein in response to a request for allocation of a vehicle from a client, the base station collects information from the terminal stations based on the polling response signal constructed of the one-frame.

With the present invention, it is needless to say that the time required for collecting information by polling can be shortened, and also AGC and AFC for a receiver can be provided in the stable state. Furthermore, an operation for polling to all vehicles can be performed at a high speed, and therefore, even in a system comprising several hundreds of mobile stations, the base station can search a mobile station at an optimal location, and also can search vehicles correctly.

BEST MODE FOR CARRYING OUT THE INVENTION

The polling method in a digital radio communication system according to the present invention is described in detail below with reference to an embodiment thereof shown in the figures. Also in the embodiment of the present invention described below, a transmitter at each in-vehicle station (mobile station) has the same block configuration as that of the receiver shown in FIG. 7. Also a receiver at the base station has the same block configuration as that of the receiver shown in FIG. 8.

However, a polling response signal transmitted from the transmitter shown in FIG. 7 is different in format from that in the prior art. As a result, also processing for receiving a polling response signal by the receiver in FIG. 8 is different from that in the prior art. Therefore, a weight is put on the differences in the following description.

At first, FIG. 1 illustrates a frame format of a polling response burst SP sent as a polling response signal from the transmitter shown in FIG. 7. In this embodiment, the polling response burst SP is sent by only one frame to polling from the base station.

In this embodiment, the channel encoding section 702 in the transmitter at the in-vehicle station shown in FIG. 7 configures a polling response signal by selecting, in addition to a frame format of the synchronous burst SB shown in FIG. 2 and a frame format of the communication channel SC shown in FIG. 3, also a format of the polling response burst SP shown in FIG. 1 according to the necessity and sends the polling response signal to the S/P (serial/parallel) converting section 703.

The frame format of the polling response burst SP shown in FIG. 1 is described below. In FIG. 1, a 44-bit linearizer preamble and a burst transient response guard time LP+R are located at a leading end. Subsequently, a 20-bit synchronous word SW, a 56-bit radio information channel RICH, and a 256-bit traffic channel TCH are placed successively, and an 8-bit guard time G is placed at a trailing end to provide 384-bit data in all.

The reason why the frame format as described above is employed is described below by comparing a frame format of the synchronous burst SB shown in FIG. 2 to a frame format of the communication channel SC shown in FIG. 3. At first, the synchronous word SW and the radio information channel RICH are described. In this polling response burst SP, the synchronous word SW is forwardly moved from a central portion of the frame, so that a work load to the receiver for synchronicity processing can be reduced.

The radio information channel RICH includes information required in the receiving side to recognize that a signal transmitted from a transmitter at an in-vehicle station and received by a receiver at the base station is a non-voice polling response signal. Because of this configuration, the receiver at the base station can easily determine whether the received signal is a non-voice polling response signal or not.

On the other hand, the linearizer preamble and burst transient response guard time LP+R are used for training a transmitter linearizer, and their signal contents are not specified in the communication channel SC shown in FIG. 3.

In the polling response burst SP shown in FIG. 1, a signal pattern of the linearizer preamble LP for the linearizer preamble and burst transient response guard time LP+R is configured with only "0" for all bits or with repetition of binary values "1" and "0". With he configuration as described above, the linearizer preamble and burst transient response guard time LP+R can be used not only form training the transmitter linearizer, but also for providing AGC and AFC to the receiver.

At first a case is described in which the linearizer preamble LP is configured only with a "0" bit pattern for all bits. In this case, to form a polling response burst SP, in the mapping section 704 of the transmitter shown in FIG. 7, all of the bit data b1, b0 inputted from the input terminals 901-1, 901-2 in FIG. 9 are set to "0", namely (b1, b0) is always (0,0). Therefore, the bit data d outputted to the accumulator 903 from the table 902 shown in FIG. 9 is always set to 1 (d=1).

As a result, because an output s from the accumulator 903 increments by 1 like 0, 1, 2, . . . for each symbol, an output from the surplus computing circuit 904 changes from 0 to 7 following the repetition of 0, 1, 2, . . . with 8 symbol cycles. Output values from the mapping section 704 correspond to the mapping points angularly displaced by $\pi/4$ radians along a unit circle on the I-Q coordinate plane shown in FIG. 10.

The output values are upsampled by the upsamplers 705-1, 705-2. Base band signals filtered by the LPFs 706-1, 706-2, and then outputted from the D/A converters 707-1, 707-2 go around counterclockwise on the unit circle once for every 8 symbols.

Next a case is described in which the linearizer preamble LP portion is configured with the repetitive bit patterns of binary values "1" and "0". In the mapping section shown in FIG. 9, the bit data b1 is "1" and bit data b0 is "0". Namely (b1, b0) is always (1,0). Therefore, always a value d of −1 is always inputted from the table 902 to the accumulator 903. As a result, an output from the surplus computing circuit 904 changes in a direction opposite to that described above like 0, 7, 6, . . . , 0, 7, 6, . . . , and therefore the base band signals outputted from the D/A converters 707-1, 707-2 go around along the unit circle once for every 8 symbols clockwise on the I-Q coordinate plane shown in FIG. 10.

When the polling response burst SP is transmitted and received by the receiver shown in FIG. 8, also the received base band signals outputted from the LPFs 805-1, 805-2 goes around with the same cycle.

With the bit patterns as described above, output signals from the LPFs 805-1, 805-2 are base band signals with an 8-symbol cycle, and thereby a frequency deviation $\Delta f$ can easily be detected from this signal.

The frequency deviation $\Delta f$ can easily be detected from the base band signals each with an 8-symbol cycle which are output signals from the LPFs 805-1, 805-2 by using the method described in the specification for Japanese Patent Application No. 2003-167966 filed by the inventor of the present invention. Detailed description of the method is omitted, and only brief description is provided herein.

At first, base band signals which are preamble signals comprising a repetitive pattern of Nptn symbols, namely base band signals each with an 8-symbol cycle which are output signals from the LPFs 805-1, 805-2 are oversampled Nov times per symbol (Nov: positive integer of 2 or more). Then an optional number of successive Nwin sample base band signals (Nwin: positive integer of 2 or more) are extracted, and of the self function $r(m)=\Sigma x(n)x^*(n-m)$ for the extracted Nwin sample base band signals $x(n)$ (n=0, 1, . . . Nwin−1) (wherein $\Sigma$ indicates a sum of n=m, m+1, . . . Nwin−1; m indicates a non-negative integer, and * in $x^*(n-m)$ indicates a complex conjugate), r(Nptn Nov) (Nptn: 8) is computed to obtain a phase $\theta$ of the r(Nptn Nov).

By using the phase $\theta$ and setting the symbol rate to fb, the frequency deviation $\Delta f$ is computed as $\theta$ fb/2Nptn$\pi$. When the frequency deviation $\Delta f$ is computed as described above, AFC can easily be provided to a receiver by using the frequency deviation $\Delta f$.

In this embodiment, when the receiver shown in FIG. 8 receives the polling response burst SP shown in FIG. 1, the receiver recognizes the fact according to information set in the radio information channel RICH, and detects the frequency deviation $\Delta f$ by executing the processing procedure described above. Then AFC is provided to the receiver by using this frequency deviation $\Delta f$. As described in the specification referred to above, because the frequency deviation $\Delta f$ can be detected regardless of synchronicity of a symbol timing, the AFC operation does not give any influence over the synchronicity of symbol timing. Therefore AFC can always be provided in the stable state in this embodiment, and increase of the error rate never occurs.

For AGC to a receiver, an average of signal powers outputted from the LPFs 805-1, 805-2 shown in FIG. 8, an average of RSSI (Received Signal Strength Indicator) signals outputted from the incoming high frequency wave section circuit 802, or an average of the two types of averages described above is used.

In this case, a gain by the incoming high frequency wave section circuit 802 is controlled according to the average power described above to maintain amplitude of signals inputted to the A/D converter 803. However, if the prior art is used in this step, control in a forward portion of a frame is not stabilized yet as described above.

On the other hand, with the frame format shown in FIG. 1, a linearizer preamble LP is placed at a leading end of a frame, and this portion is configured with the all bit "0" pattern or a repetitive pattern of binary values "1" and "0". Because bits in this portion do not provide any information, AGC can easily be stabilized before the synchronous word SW portion, and increase of an error rate never occurs.

In a case of the bit pattern of the polling response burst SP, namely when the polling response burst SP is configured with the bit pattern of all bit "0" pattern or with a repetitive pattern of binary values of "1" and "0", the burst signals go around in the base band on the I-Q coordinate plane, so that the envelope curve becomes constant. As a result, also powers of the RSSI signal and outputs from the LPFs 805-1, 805-5 are kept at constant values. Because of the feature as described above, in this embodiment, AGC can easily be stabilized before the synchronous word SW, and also an average power required for the operation can be computed by averaging within a short period of time. Therefore, with this embodiment, AGC control can be obtained with a simple configuration.

As described above, when the frame format shown in FIG. 1 is employed for the polling response burst SP, a receiver at the base station can provide able AGC and AFC operations only by receiving the one-frame polling response burst SP. As a result, the time required for collection of vehicle's current state information by polling can be shortened as compared to that in the prior art. When vehicle's current state information is to be collected from 400 taxies, the time required for collecting the information is 64 seconds in the prior art, but only 16 seconds suffice in this embodiment. In the embodiment of the present invention, the time required for polling can be shortened without causing increase in the receiving error rate, which enables efficient operations for polling.

An optimal vehicle searching method using the high speed polling method described above is described below. At first, problems in the conventional vehicle searching method are described below for facilitating the understanding of the present invention. FIG. 11 illustrates a system of polling all mobile stations (taxies) in an AVM system for allocation of taxies based on the prior art. FIG. 11(a) shows a polling signal PO sent from the base station 501. In this case, a polling signal PO comprises, for instance, 5 frames (1 frame=40 ms), and length of one polling system is 200 ms. In this case, the data collection speed is 2,400 bps. When the polling signal is sent to 300 mobile stations, the polling cycle T including a pause period is about 60.4 seconds.

In response to the polling signal PO, all of the in-vehicle stations 502-1, 502-2, . . . 502-N transmit polling response signals S1, S2, . . . Sn respectively at a prespecified timing to the base station 501 as shown in FIG. 11(b). Therefore, in this polling system, the polling cycle T1 is 60.4 seconds, and about one minute is required for recognizing positions of all vehicles. Namely search for vehicles can be performed only once within a one-minute cycle.

FIG. 14(a) indicates contents of a polling signal PO, while FIG. 14(b) indicates a polling response signal S. In FIG. 14(a), data length (polling signal length) is 200 ms, and a signal type 1401 is information indicating that the signal is a polling signal. A polling vehicle number specification 1402 is information used for collecting current state information of each in-vehicle station, for instance, by specifying any of the in-vehicle stations 502-1, 502-2, . . . 502-N. A reference numeral 1403 denotes a spare bit. Also in FIG. 14(b), also the data length (polling response signal length) is 200 ms, and a signal type 1404 is information indicating that the signal is a polling response signal. Current state information 1405 is vehicle's current state information such as information as to whether a vehicle in which a corresponding in-vehicle station is loaded is occupied by a passenger or not, a vehicle speed, or any abnormal state in the vehicle. Positional information 1406 indicates a current position of a vehicle which an in-vehicle station in the vehicle acquires from the GPS, and the information is expressed, for instance, by longitude and latitude.

Thus, because a polling cycle for searching vehicles is performed once in each polling cycle in this type of AVM system for allocation of taxies based on the prior art, the positional information can be acquired once in one minute. Therefore, when allocation of a vehicle is requested from a client, the management center allocates a vehicle based on positional information one minute earlier, resulting in that optimal allocation of an optimal vehicle can not be carried out. This problem becomes more serious as an AVM system for taxi allocation becomes larger.

FIG. 12 is a general block diagram illustrating an embodiment of an optimal vehicle searching method according to the present invention, and this figure illustrates an example of the AVM system for taxi allocation making use of GPS. Referring to FIG. 12, the reference numerals 1201-1, 1201-2, . . . 1201-n denote base stations. The base stations are generically referred to as a base station 1201. Reference numeral 1202 indicates a management center, which is connected to a plurality of base stations 1201 via a dedicated line 1203. Reference numerals 1204-1, 1204-2, . . . , 1204-N denote mobile stations (in-vehicle stations) respectively. The mobile stations are generically referred to as a mobile station 1204. Reference numeral 1205 denote a communication area, namely a communication zone in which the base station 1201-1 can communicate with the mobile stations 1204, and the mobile station 1204-1 within this communication area 1205 can communicate with the base station 1201-1. Reference numeral 1206 indicates a GPS satellite, and each mobile station 1204 can acquire positional information (by latitude and longitude) of own vehicle by receiving positional information 1207 from the GPS satellite 1206. In response to an instruction from the management center 1202, each base station 1201 transmits a polling signal PO to each of the mobile stations 1204, and the mobile stations send polling response signals S1, S2, . . . Sn to the respective base stations in response to the polling signal PO. In other words, this system is such that the management center 1202 collects vehicle's current state information from the mobile stations 1204 in the communication area 1205 according to a sequence of vehicle numbers according to a specification of a vehicle number for each mobile station from each base station 1201. In the present invention, radio communication between the base station and the mobile stations is performed based on, for instance, the digital SCPC system. It is to be noted that the management center 1202 may be integrated with the base station 1201.

Next, the polling system used in the optimal vehicle search method according to the present invention is described below with reference to FIG. 13 and FIG. 15. FIG. 13(a) illustrates a polling signal PO1 transmitted from the base station 1201 in FIG. 12. This polling signal PO1 has the signal length of 40 ms. This signal has, for instance, the format of the communication channel SC shown in FIG. 3, and therefore in the polling signal PO1, 96 bits for the radio information channel RICH, a synchronous word SW, and an undefined section UD are configured into 1 frame (40 ms), and all of other bits are set to "0". Because the polling signal PO1 has the signal length of 40 ms, for instance, when polling is performed to all of 300 mobile stations, the polling cycle T2 is 12.4 seconds including the pausing time. In other words, vehicle search can be made once for every 12.4 seconds. FIG. 13(a) illustrates only the polling signal PO1, but typically the base station always transmits an aerial signal to establish synchronicity between the base station and each mobile station.

FIG. 15(a) illustrates contents of the polling signal PO1. The polling signal PO1 is configured of a signal type 1501, a polling vehicle specification 1502, and a spare 1503, and the data length (polling signal length) is 40 ms.

In response to this polling signal PO1, the mobile stations 1204-1, 1204-2, . . . , 1204-N send polling response signals SR1, SR2, . . . , SRn at a prespecified timing from each in-vehicle station to the base station 1201 respectively. The polling response signals are generically referred to as a polling response signal SR. Therefore in this polling system according to the present invention, a polling cycle T2 for 300 mobile stations is a repetition of 12.4 seconds, and a position of each of the 300 vehicles can be recognized once for every 12.4 seconds for searching each vehicle.

FIG. 15(b) illustrates contents of the polling response signal SR. The polling response signal SR is configured of a signal type 1504, current state information 1505, and positional information 1506, and the data length (polling response signal length) is 40 ms. Contents of each data shown in FIG. 15 is the same as those shown in FIG. 14.

The 1 frame (96 bits, 40 ms) is used as a polling signal PO1 from the base station 1201, while the polling signal PO, an aerial signal, data and the like are also transmitted from the base station, and all of the signals and data include a synchronous word SW. Therefore, each mobile station can perform the processing for establishing synchronicity with the base station according to the synchronous word.

The polling response signal SR from the mobile station 1204 is transmitted from each mobile station according to a different timing and at a different transmission level, and generally several frames are transmitted to start communications as shown in FIG. 4. In this method, however, the polling speed can not be raised, and therefore in the polling system according to the present invention, one frame (96 bits, 40 ms) is used also for the polling response signal SR like for the polling signal PO1. The polling response signal SR may be one frame for the reason described with reference to FIG. 1 illustrating the embodiment of the present invention described above. Namely, in FIG. 1, a polling response burst SP transmitted as a polling response signal is transmitted by only one frame. Because a leading end of this frame is configured as a all-bit "0" pattern, or a repetitive pattern of binary values "1" and "0", AGC for a receiver in the base station 1201 can be provided in the stable station. Because no error occurs in the AGC operation, increase in an error rate never occurs. Therefore, even though the polling response signal SR is configured of only one frame, the base station 1201 can accurately collect vehicle's current station information from each mobile station 1204. In this context, the polling response signal SR is described as a 96-bit signal, but in FIG. 1, the polling response signal is illustrated as a 384-bit signal, because the figures shows the state after coding defined in ARIB STD-T61, namely CRC coding, insertion of fixed bits, convolution coding, and interleave are performed.

The polling signal PO1 shown in FIG. 13(a) has the signal length of 40 ms, and is used for polling with the cycle T2 of 12.4 seconds. On the other hand, the mobile station sends a polling response signal with the signal length of 40 ms to the base station 1201 as shown in FIG. 13(b). When there are 300 mobile stations, the base station 1201 sends polling signals PO1 to all of the mobile stations within the communication area 1205 specifying each of the mobile station vehicle numbers 1 to 300. Each mobile station 1204 computes the timing for sending a polling response signal based on a vehicle number previously assigned to the mobile station, and sends a polling response signal SR in the corresponding transmission slot. Furthermore, the base station 1201 sends a polling signal, after passage of the pausing time, specifying each mobile station vehicle numbers starting from 1 up to 300, and thus the base station can collect current state information from all of the mobile stations in the communication area 1205 by repeating the same operation. In the present invention, the digital SOPS system is used as a radio communication system for business service, and therefore the data transfer rate is 9,600 bps. Thus the time required for collecting positional information from all of the mobile stations is 12.4 seconds.

Next the optimal vehicle search method using the polling system according to the present invention is described with reference to FIG. 16. FIG. 16(a) provides a map screen 1603 displaying a client 1601 requesting allocation of a vehicle and a road 1602. This map screen 1603 is displayed, for instance, on a display unit of a personal computer (not shown) at the management center 1202. A case in which the client 1601 hoping allocation of a vehicle sends a request for allocation of a vehicle to the management center 1202 at a time point t1 is described with reference to FIG. 16(b) and FIG. 16(c).

At first, the vehicle search method using the conventional polling system shown in FIG. 11 is described. It is assumed in the following description that the management center 1202 accepts a request for allocation of a vehicle from the client 1601 at the time point t1. Because the polling cycle T1 of the polling signal shown in FIG. 11 is 60.4 seconds, so that the management center 1202 issues, at the time point t1, an instruction for allocation to a vehicle not occupied by a passenger at a position closest to the client 1601 based on positional information collected from the mobile stations 1204 1 minute earlier by performing polling. Namely, in FIG. 16(b), assuming that polling information is collected from mobile stations 1604 and 1605 1 minute earlier by polling, the mobile station 1605 is closer to the client 1601 at this time. Therefore the management center issues an instruction for allocation of a vehicle to the mobile station 1065.

In contrast, the vehicle search method using the polling system according to the present invention as shown in FIG. 13 is described below. It is assumed in the following description that the management center 1202 accepts a request for allocation of a vehicle from the client 1601 also at the time point t1. Because the polling cycle T2 of the polling signal shown in FIG. 13 is 12.4 seconds, the management center 1202 issues an instruction for allocation of a vehicle to a mobile station of a vehicle not occupied with a passenger and closer to the client 1601 based on the positional information of the mobile stations 1204 collected 12.4 second earlier by polling. Namely, as shown in FIG. 16(c), because the mobile stations 1604 and 1605 are moving on the road 1602, unlike the positions of the mobile stations recognized by polling 12.4 seconds earlier, actually the mobile station 1604 is closer to the client 1601. Therefore the management center issues an instruction for allocation of a vehicle to the mobile station 1604. In other words, actually a moving velocity of each mobile station is faster, and the mobile stations 1604 becomes more closer to a position of the client. Therefore, with the polling system according to the present invention performed with the polling cycle of 12.4 seconds, it is possible to collect positional information of each mobile station at the oldest about 12 seconds earlier, so that the mobile station 1604 can accurately be recognized as an optimal vehicle for allocation. As described above, when the time required for collecting, for instance, positional information of mobile stations by polling is shortened, an instruction for allocation of a vehicle can be issued to a mobile station closest to a position of a client hoping allocation of a vehicle. Thus an optimal vehicle allocation system can be constructed, which enables efficient administration of a taxi radio allocation system.

The present invention has been described in detail above, but the present invention is not limited to the examples of the polling method and optimal vehicle search method based on a digital radio communication system described above, and the present invention can widely be applied to a polling method and an optimal vehicle search method based on other types of digital radio communication systems.

BRIEF DESCRIPTION OF THE DRAWINGS

FIG. 1 is an explanatory view illustrating an example of a polling response signal employed in an embodiment of a polling method in a digital radio communication system according to the present invention;

FIG. 2 is an explanatory view illustrating an example of a frame structure of an synchronous burst;

FIG. 3 is an explanatory view illustrating an example of a frame configuration of a communication channel;

FIG. 4 is an explanatory view showing an example of a frame transmitted when communication is performed based on the SCPC system;

FIG. 5 is a block diagram showing an example of a digital radio communication system used for collecting information from each terminal station by polling;

FIG. 13 is an explanatory view showing a timing relation between a polling signal and a polling response signal when information is collected based on the polling system according to the present invention;

DESCRIPTION OF SYMBOLS

Figure 6:
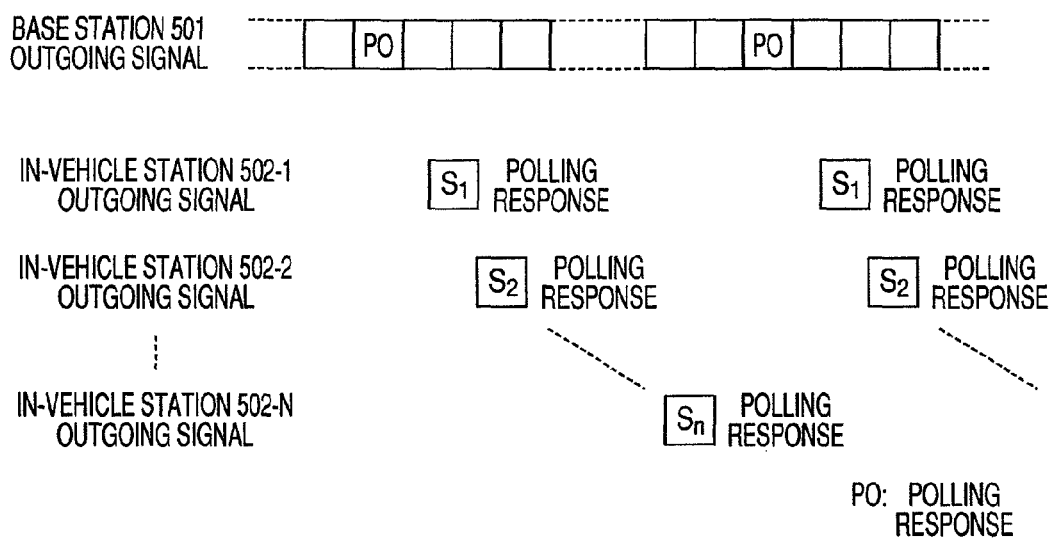
FIG. 6 is an explanatory view showing a timing relation between a polling signal and a polling response signal when information is collected by polling.
Figure 7:
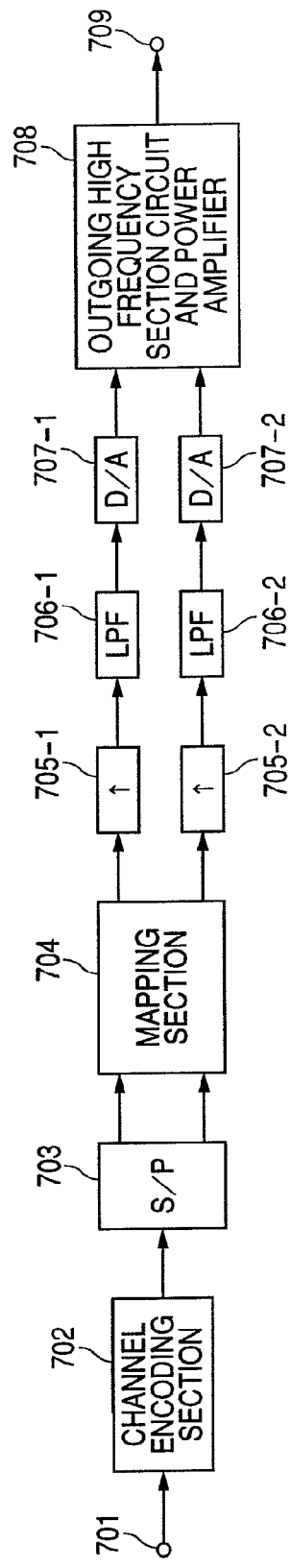
FIG. 7 is a block diagram showing an example of a transmitter at an in-vehicle station.
Figure 8:
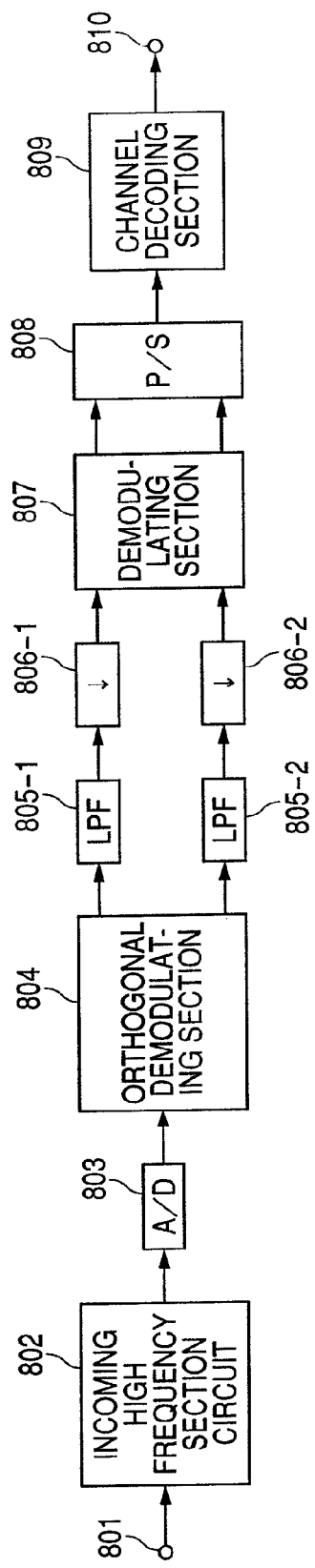
FIG. 8 is a block diagram showing an example of a receiver at a base station.
Figure 9:
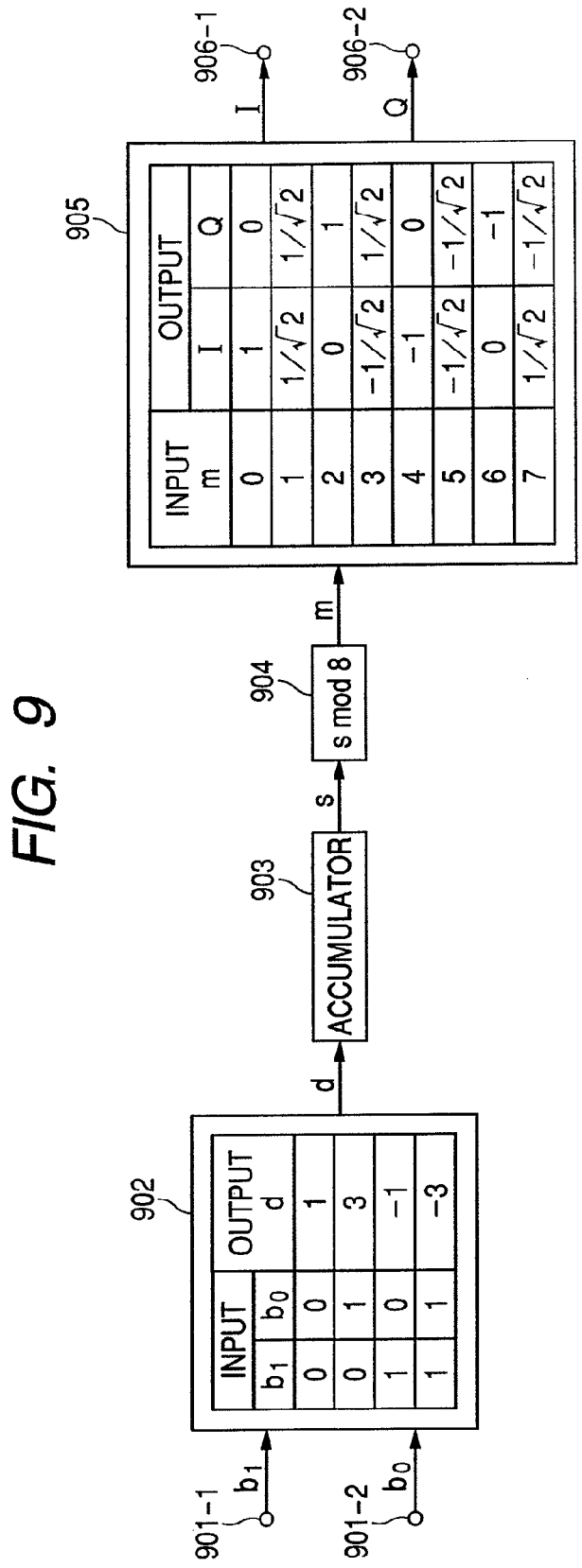
FIG. 9 is a block diagram showing an example of a mapping section of a transmitter.
Figure 10:
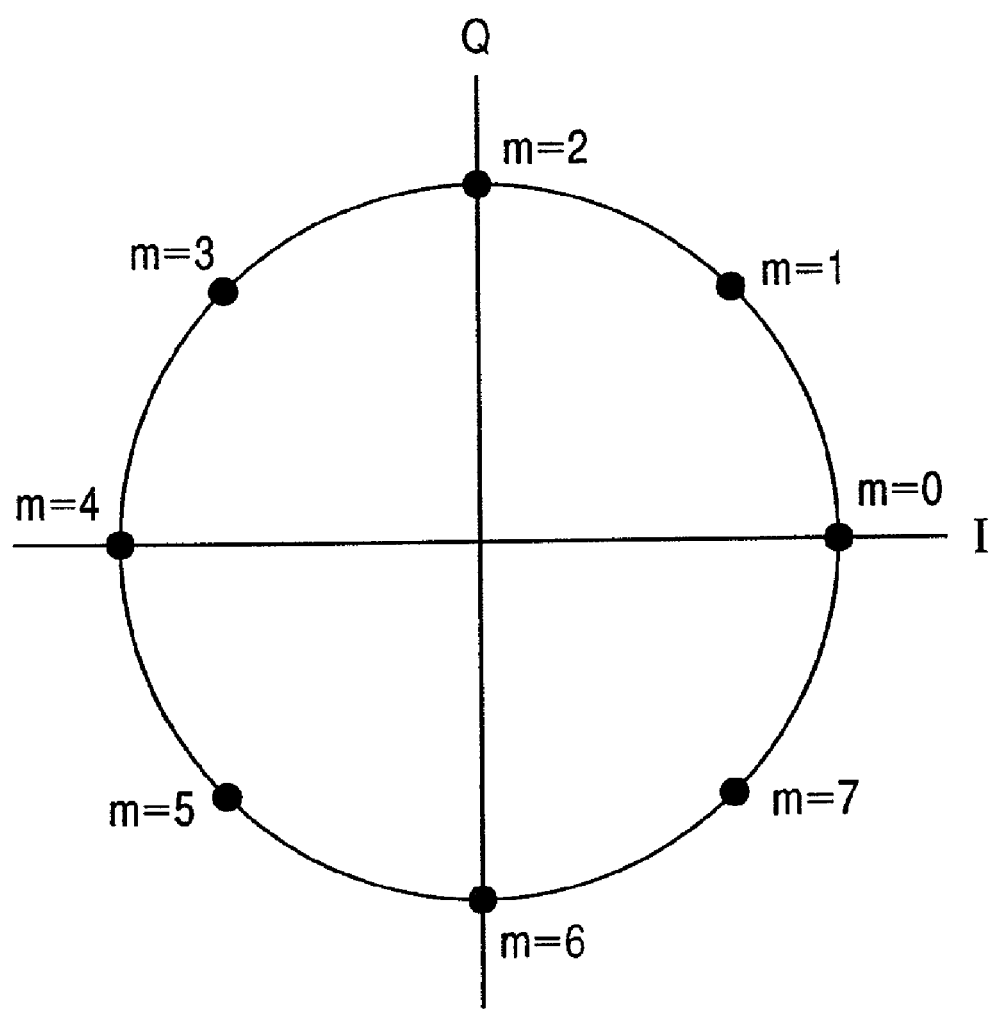
FIG. 10 is an explanatory view illustrating an output value from a table in the mapping section in an application of the present invention shown on the I-Q coordinate plane.
Figure 11A:
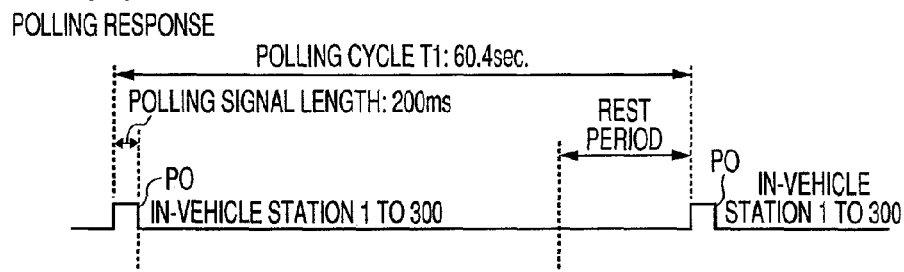
FIG. 11 is an explanatory view showing a timing relation between a polling signal and a polling response signal when information is collected based on a polling system based on the prior art.
Figure 11B:
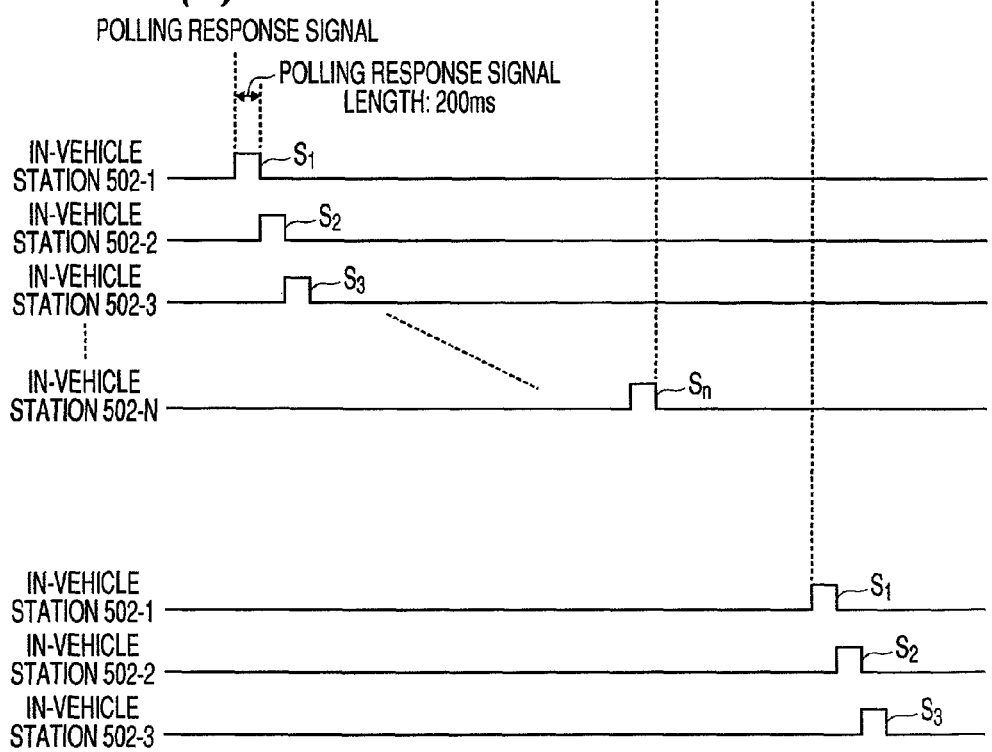
Figure 12:
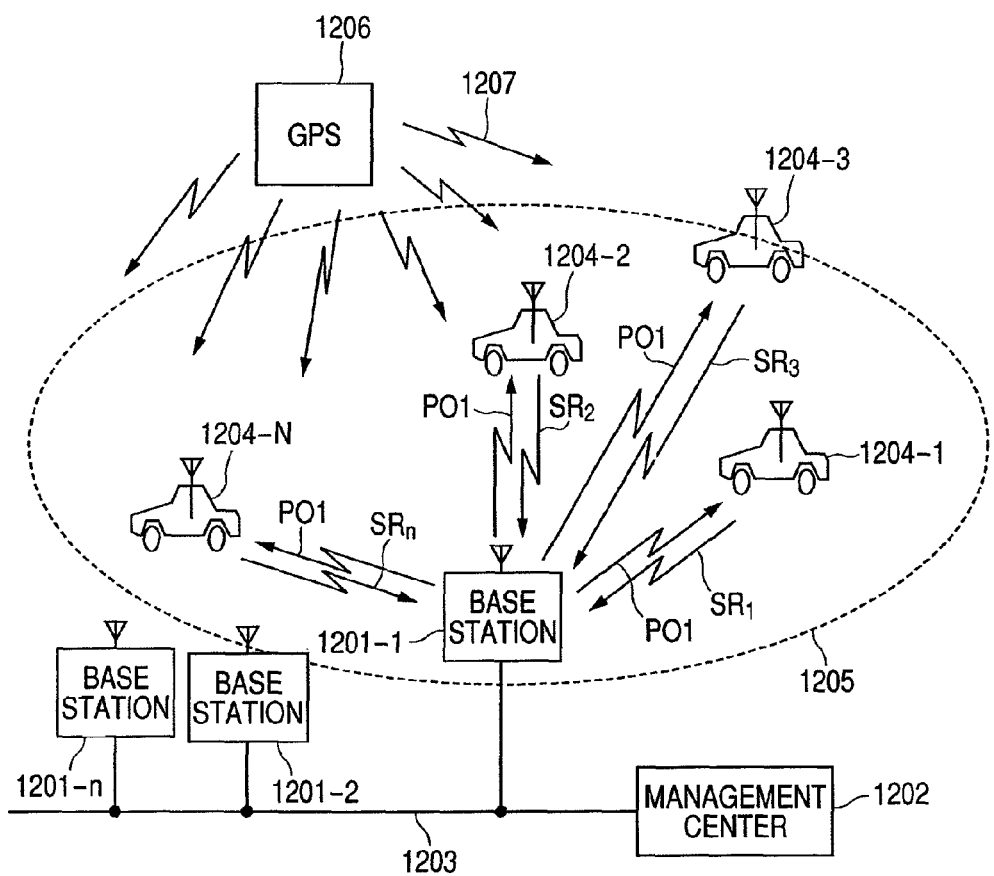
FIG. 12 is a block diagram showing an example of a digital radio communication system using the polling system according to the present invention.
Figure 14A:
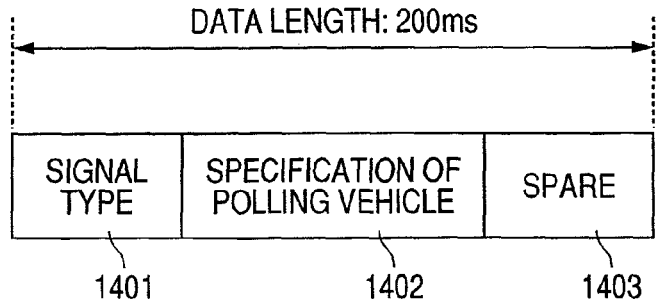
FIG. 14 is a view illustrating contents of a polling signal and a polling response signal based on the prior art.
Figure 14B:
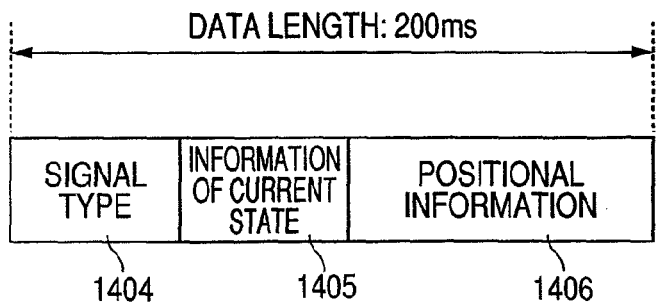
Figure 15A:
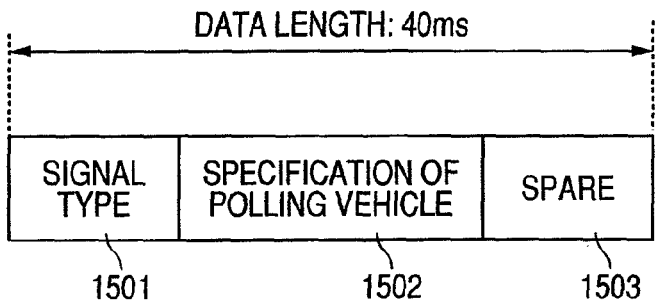
FIG. 15 is a view illustrating contents of a polling signal and a polling response signal according to the present invention.
Figure 15B:
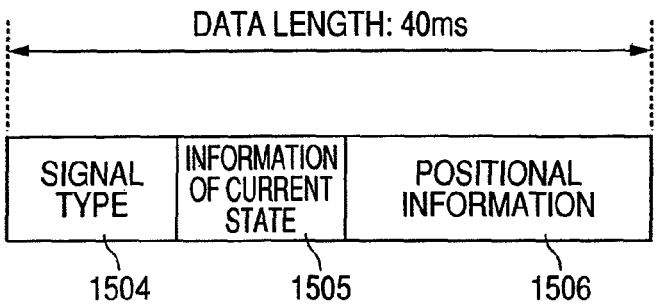
Figure 16A:
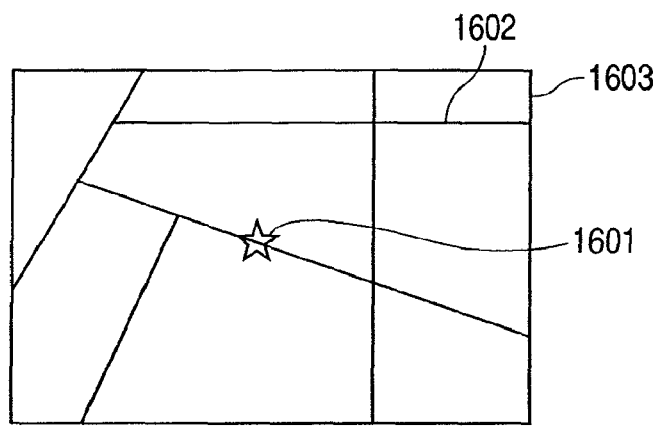
FIG. 16 is a view showing a display screen for illustrating an example of an optimal vehicle search system according to the present invention.
Figure 16B:
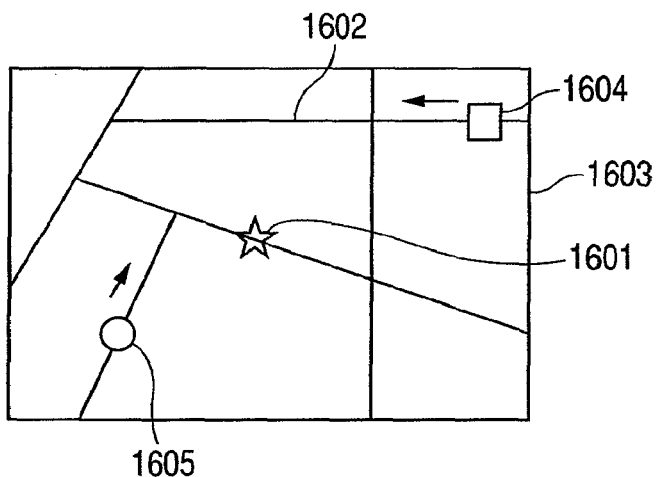
Figure 16C:
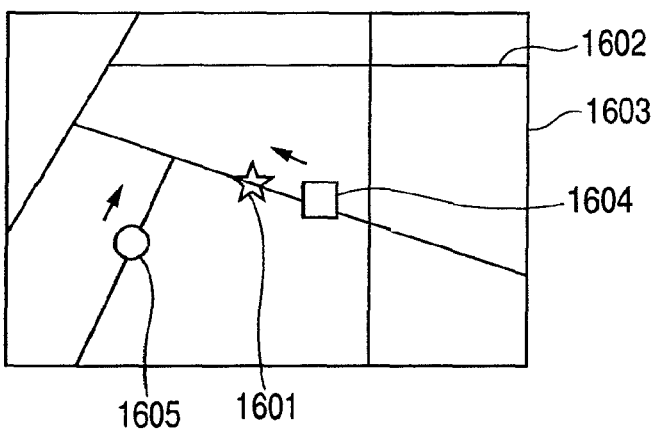

501: Base station,
502-1 to 502N: In-vehicle station
701: Transmitted data input terminal
702: Channel encoding section
703: S/P (serial/parallel) converting section
704: Mapping section
705-1, 705-2: Upsampler
706-1, 706-2, 805-1, 805-2: LPF (low-pass filter)
707-1, 707-2: D/A digital/analog) converter
708: High frequency wave section circuit and power amplifier
709: Outgoing signal output terminal
801: Incoming signal input terminal
802: Incoming high frequency wave section circuit
803: A/D (analog/digital) converter
804: Orthogonal component demodulating section
806-1, 806-2: Downsampler
807: Demodulating section
808: P/S (parallel/serial) converting section
809: Channel decoding section
810: Received data output terminal
901-1, 901-2: Bit data input terminal
902, 905: Table
903: Accumulator
904: Surplus computing circuit
906-1: Inphase component output terminal
906-2: Orthogonal component output terminal
1201-1 to 1201-$n$: Base station
1202: Management center
1203: Communication-dedicated line
1204-1 to 1204-N: Mobile station
1205: Communication area
1206: GPS satellite
1207: Positional information
1601: Client
1602: Road
1603: Display screen
1604, 1605: Mobile station

What is claimed is:

1. A digital radio communication system for collecting information as a polling response signal by polling comprising:

a base station for transmitting a polling signal; and a plurality of mobile stations for transmitting said poling response signal including information about a current state of each mobile station to said base station, wherein each of said mobile stations transmits only one frame of a communication channel as said polling response signal when each of said mobile stations has received said polling signal, and said communication channel constructs said one frame in which a cyclic bit pattern is placed at a leading end of a frame format and successively a synchronous word is placed, and wherein said base station controls an Automatic Gain Control (AGC) by said cyclic bit pattern and performs the processing for establishing synchronicity with the base station according to said synchronous word when said base station has received said polling response signal, and then said base station receives said poling response signal by only one frame of said communication channel.

2. A digital radio communication system according to claim 1, wherein a modulating system for said digital radio communication system is the π/4 shift QPSK system, and said base station obtains a power of a constant value by orthogonal demodulating said cyclic bit pattern and controls AGC.

3. A digital radio communication system according to claim 1, wherein a timing of polling response signals transmitting from said each of said mobile stations to said base station is equivalent to a length of one frame of said communication signal, and said each of said mobile stations transmits one frame of said communication channel as said polling response signal from each of plurality of mobile stations sequentially, to one polling cycle by one time, and wherein said base station performs the collecting said polling response signals sequentially from said mobile station by transmitting only once.

4. A polling method in a digital radio communication system concluding a base station for transmitting a poling signal and a plurality of mobile stations for transmitting a poling response signal including information about a current state of each mobile station to said base station, wherein each of said mobile stations transmits only one frame of a communication channel as said polling response signal when each of said mobile stations has received said polling signal, and said communication channel constructs said one frame in which a cyclic bit pattern is placed at a leading end of a frame format and successively a synchronous word is placed, and wherein said base station controls an Automatic Gain Control (AGC) by said cyclic bit pattern and performs the processing for establishing synchronicity with the base station according to said synchronous word when said base station has received said polling response signal, and then said base station receives said poling response signal by only one frame of said communication channel.

5. The polling method according to claim 4, wherein a modulating system for said digital radio communication system is the π/4 shift QPSK system, and said base station obtains a power of a constant value by orthogonal demodulating said cyclic bit pattern and controls AGC.

6. The polling method according to claim 4, wherein a timing of polling response signals transmitting from said each of said mobile stations to said base station is equivalent to a length of one frame of said communication signal, and said each of said mobile stations transmits one frame of said communication channel as said polling response signal from each of plurality of mobile stations sequentially, to one polling cycle by one time, and wherein said base station performs the collecting said polling response signals sequentially from said mobile station by transmitting only once.

* * * * *